(12) United States Patent  
Li et al.

(10) Patent No.: US 10,026,446 B2  
(45) Date of Patent: Jul. 17, 2018

(54) INTELLIGENT PLAYBACK METHOD FOR VIDEO RECORDS BASED ON A MOTION INFORMATION AND APPARATUS THEREOF

(71) Applicant: HANGZHOU HIKVISION DIGITAL TECHNOLOGY CO., LTD., Hangzhou (CN)

(72) Inventors: Zhicheng Li, Hangzhou (CN); Hualiang Chen, Hangzhou (CN); Chenghua Sun, Hangzhou (CN)

(73) Assignee: HANGZHOU HIKVISION DIGITAL TECHNOLOGY CO., LTD., Hangzhou, Zhejaing (CN)

( * ) Notice: Subject to any disclaimer, the term of this patent is extended or adjusted under 35 U.S.C. 154(b) by 0 days.

(21) Appl. No.: 15/025,355

(22) PCT Filed: Aug. 14, 2014

(86) PCT No.: PCT/CN2014/084426  
§ 371 (c)(1),  
(2) Date: Mar. 28, 2016

(87) PCT Pub. No.: WO2015/043328  
PCT Pub. Date: Apr. 2, 2015

(65) Prior Publication Data  
US 2016/0217825 A1 Jul. 28, 2016

(30) Foreign Application Priority Data  
Sep. 27, 2013 (CN) .......................... 2013 1 0454800

(51) Int. Cl.  
*G11B 27/00* (2006.01)  
*H04N 7/18* (2006.01)  
(Continued)

(52) U.S. Cl.  
CPC ...... *G11B 27/005* (2013.01); *G08B 13/19665* (2013.01); *G11B 27/105* (2013.01);  
(Continued)

(58) Field of Classification Search  
CPC ............ G08B 13/19665; G11B 27/005; G11B 27/105; G11B 27/22; G11B 27/3081  
(Continued)

(56) References Cited

U.S. PATENT DOCUMENTS

| 5,615,018 A | 3/1997 | Wu et al. |
| 2002/0039481 A1 | 4/2002 | Jun et al. |

(Continued)

FOREIGN PATENT DOCUMENTS

| CN | 1732685 | 2/2006 |
| CN | 101600107 | 12/2009 |

(Continued)

OTHER PUBLICATIONS

International Search Report of International Application PCT/CN/2014/084426, dated Nov. 4, 2014, 2 pages.

(Continued)

*Primary Examiner* — William C Vaughn, Jr.  
*Assistant Examiner* — Daniel Tekle  
(74) *Attorney, Agent, or Firm* — Hamre, Schumann, Mueller & Larson, P.C.

(57) ABSTRACT

The present invention relates to data application technologies in the field of video surveillance, and discloses an intelligent playback method for video records based on a motion information and an apparatus thereof. The method comprises the following steps: searching for all motion detection additional information conforming to a time period of a playback request in a hard disc, and storing the motion detection additional information as a motion information in a motion information linked list in terms of a time sequence;

(Continued)

obtaining a current playback mode and a current playback time, and looking up a nearest motion information under the current playback mode and the current playback time from the motion information linked list; matching the found nearest motion information with the current playback time; controlling a playback speed according to a matching result, so as to implement an automatic control of an intelligent playback speed. A real-time, automatic, continuous control of a playback speed can be implemented by repeating performing the above steps, so that automatically adjusting to a normal playback speed when there is motion data and automatically adjusting to a rapid playback when there is no motion data are implemented, and a playback time of video records can be reduced.

5 Claims, 7 Drawing Sheets (51) Int. Cl.
*G11B 27/10* (2006.01)
*G11B 27/22* (2006.01)
*G11B 27/30* (2006.01)
*G11B 27/34* (2006.01)
*G08B 13/196* (2006.01)
*H04N 5/783* (2006.01)
*H04N 21/2387* (2011.01)
*H04N 21/432* (2011.01)
*H04N 5/77* (2006.01)

(52) U.S. Cl.
CPC .......... *G11B 27/22* (2013.01); *G11B 27/3081* (2013.01); *G11B 27/34* (2013.01); *H04N 5/77* (2013.01); *H04N 5/783* (2013.01); *H04N 7/18* (2013.01); *H04N 21/2387* (2013.01); *H04N 21/4325* (2013.01)

(58) Field of Classification Search
USPC ......................................................... 386/290
See application file for complete search history.

(56) References Cited

U.S. PATENT DOCUMENTS

| 2006/0036783 | A1 | 2/2006 | Aarts |
| 2007/0076794 | A1 | 4/2007 | Yatabe et al. |
| 2007/0201817 | A1* | 8/2007 | Peker ................ G06F 17/30787 386/329 |
| 2008/0095519 | A1* | 4/2008 | You ..................... G11B 27/105 386/224 |

FOREIGN PATENT DOCUMENTS

| CN | 101702771 | 5/2010 |
| CN | 102314916 | 1/2012 |
| CN | 102387347 | 3/2012 |
| CN | 103020624 | 4/2013 |
| EP | 2066128 | 6/2009 |
| JP | 2012060671 | 3/2012 |
| WO | 2004059971 | 7/2004 |

OTHER PUBLICATIONS

Extended European Search Report for European application No. 14849306.7, dated Aug. 17, 2016 (7 pages).

* cited by examiner

INTELLIGENT PLAYBACK METHOD FOR VIDEO RECORDS BASED ON A MOTION INFORMATION AND APPARATUS THEREOF

FIELD OF THE INVENTION

The present invention relates to data application technologies in the field of video surveillance, particularly relates to an intelligent playback technology for video records based on a motion information.

BACKGROUND OF THE INVENTION

Currently, in the field of video surveillance, valuable dynamic pictures are more concerned when video record files are played back, however in fact the video records usually carry a large number of static pictures without motion information. Thus, a user often looks up a dynamic picture by means of dragging or adjusting a playback speed, when playing back a video record. These means are often easy to miss a dynamic picture required to be concerned, and an operation with a manual means has defects such as low efficiency, low accuracy and inconvenience etc..

<METHOD, SYSTEM AND APPARATUS FOR ADJUSTING A PLAY SPEED OF VIDEO RECORDS> provides a method for parsing and encoding a speed grade in a key frame of video data, utilizing the speed grade to adjust a decoding speed of a decoder and control a media server to selectively read the video data, so as to adjust a play speed of video records.

Its disadvantages are:

(1) the media server selectively obtains the video data from a storage apparatus according to the play speed, which easily leads to a loss of a playback picture.

(2) if a video record file is comprised of many dynamic pictures with small time intervals therebetween within a certain time period, parsing and encoding a speed grade in a key frame of video data to constantly adjust the speed would easily lead to an unsmooth playback.

Wherein, a decoder refers to a program or a device which is able to compress or decompress a digital video.

SUMMARY OF THE INVENTION

The purpose of the present invention is to provide an intelligent playback method for video records based on a motion information and an apparatus thereof, so as to automatically control a playback speed of video records, automatically adjusting to a normal playback speed when there is motion data and automatically adjusting to a rapid playback when there is no motion data, which achieves an effect of rapidly filtering a static picture, focusing on a motion picture having motion data and reducing a playback time of video records To solve the above technical problems, one embodiment of the present invention discloses an intelligent playback method for video records based on a motion information, which comprises the following steps:

searching for all motion detection additional information conforming to a time period of a playback request in a hard disc, and storing the motion detection additional information as a motion information in a motion information linked list in terms of a time sequence, wherein the motion detection additional information is utilized for recording information of a key frame having motion data in video record data;

obtaining a current playback mode and a current playback time, and looking up a nearest motion information under the current playback mode and the current playback time from the motion information linked list;

matching the found nearest motion information with the current playback time;

controlling a playback speed according to a matching result, so as to implement an automatic control of an intelligent playback speed.

Another embodiment of the present invention also discloses an intelligent playback apparatus for video records based on a motion information, which comprises:

a searching module that searches for all motion detection additional information conforming to a time period of a playback request in a hard disc, and stores the motion detection additional information as a motion information in a motion information linked list in terms of a time sequence, wherein the motion detection additional information is utilized for recording information of a key frame having motion data in video record data;

a retrieving module that looks up a nearest motion information under a current playback mode and a current playback time in the motion information linked list according to the current playback mode and the current playback time;

a matching module that matches the found nearest motion information with the current playback time;

a playback control module that controls a playback speed according to a matching result of the matching module, so as to implement an automatic control of an intelligent playback speed.

Comparing the embodiments of the present invention with prior arts, the main differences and their effects are:

By judging if a current playback time has a motion detection information, a static picture not having motion data and a motion picture having motion data are distinguished, and a playback speed of video records is automatically controlled, automatically adjusting to a normal playback speed when there is motion data and automatically adjusting to a rapid playback when there is no motion data, which rapidly filters the static picture, focuses on the motion picture having motion data and can reduce a playback time of video records.

Further, integrating motion segment fragments and combining a previous and a latter motion segments of short durations into a segment of a long duration may ensure continuity and observability during a playback of video records.

Further, an integration of motion picture fragments has been preliminarily implemented through integrating a motion information by means of a time threshold, which ensures smooth and observability of pictures during playback in an extent.

Further, a time threshold is utilized to adjust the playback speed to a normal speed before a motion picture has appeared, so that a user could observe a static circumstance before a motion in more detail, ensuring obtaining more observation details.

Further, utilizing a normal speed playback when a motion picture is played back and utilizing a rapid playback when a static picture is played back may reduce a playback time of record files, rapidly filter the static picture and focus on the motion picture having motion data.

DETAILED DESCRIPTION OF THE PREFERRED EMBODIMENTS

In the following description, many technical details are provided for readers to better understand the application. However, it is understood to those skilled in the art that the technical solution claimed to be protected by those claims of this application can also be realized even without these technical details and not based on various changes and modifications of the following embodiments.

For the purpose, technical solution and merits of this invention to be clearer, the following will further describe the embodiments of this invention in detail with reference to the accompanying drawings.

The present invention provides an intelligent playback method for video records based on a motion information and an apparatus thereof. The present invention may automatically adjust a playback speed according to a certain control manner when record files are played back, based on a motion information in hard disc record files. It automatically adjusts to a normal speed playback mode when playing back to a motion picture having motion data, and automatically adjusts to a rapid playback mode when playing back to a static picture not having motion data. And utilizing a method for matching time and integrating fragments provided by the present invention ensures smooth and observability of pictures during a playback.

Figure 1:
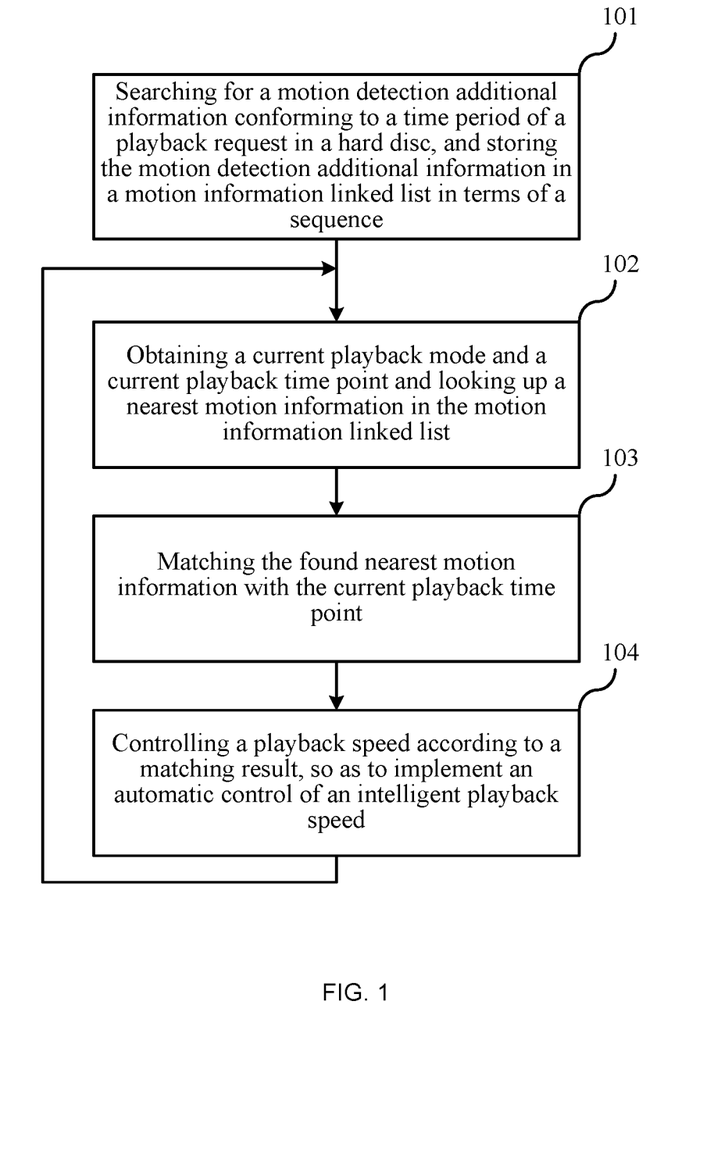
FIG. 1 is a flowchart of an intelligent playback method for video records based on a motion information according to the first embodiment of the present invention.

The first embodiment of the present invention relates to an intelligent playback method for video records based on a motion information. FIG. 1 is a flow chart of the intelligent playback method for video records based on a motion information.

Specifically, as shown in FIG. 1, the intelligent playback method for video records based on a motion information comprises the following steps:

In step 101, all motion detection additional information conforming to a time period of a playback request in a hard disc are searched for, and the motion detection additional information is stored as a motion information in a motion information linked list in terms of a time sequence, wherein the motion detection additional information is utilized for recording information of a key frame having motion data in video record data.

A playback refers to an action of displaying the recorded data, which includes videos, audios, images etc.. An intelligent playback is a playback manner for a record file, which may automatically control a playback speed of a record file according to if there is a motion information.

A motion detection additional information refers to one kind of an additional information of a key frame (I frame) in a video record file, which is utilized for recording information of a key frame having motion data in a video record file, and a motion detection additional information includes an absolute time scale, a relative time scale, a motion information of the key frame, a main type, a sub type of the additional information and a relative offset of next additional information of same type etc.. The information is obtained via a certain motion detection algorithm during recording, and encoded and stored with a video record data in a hard disc.

Figure 2:
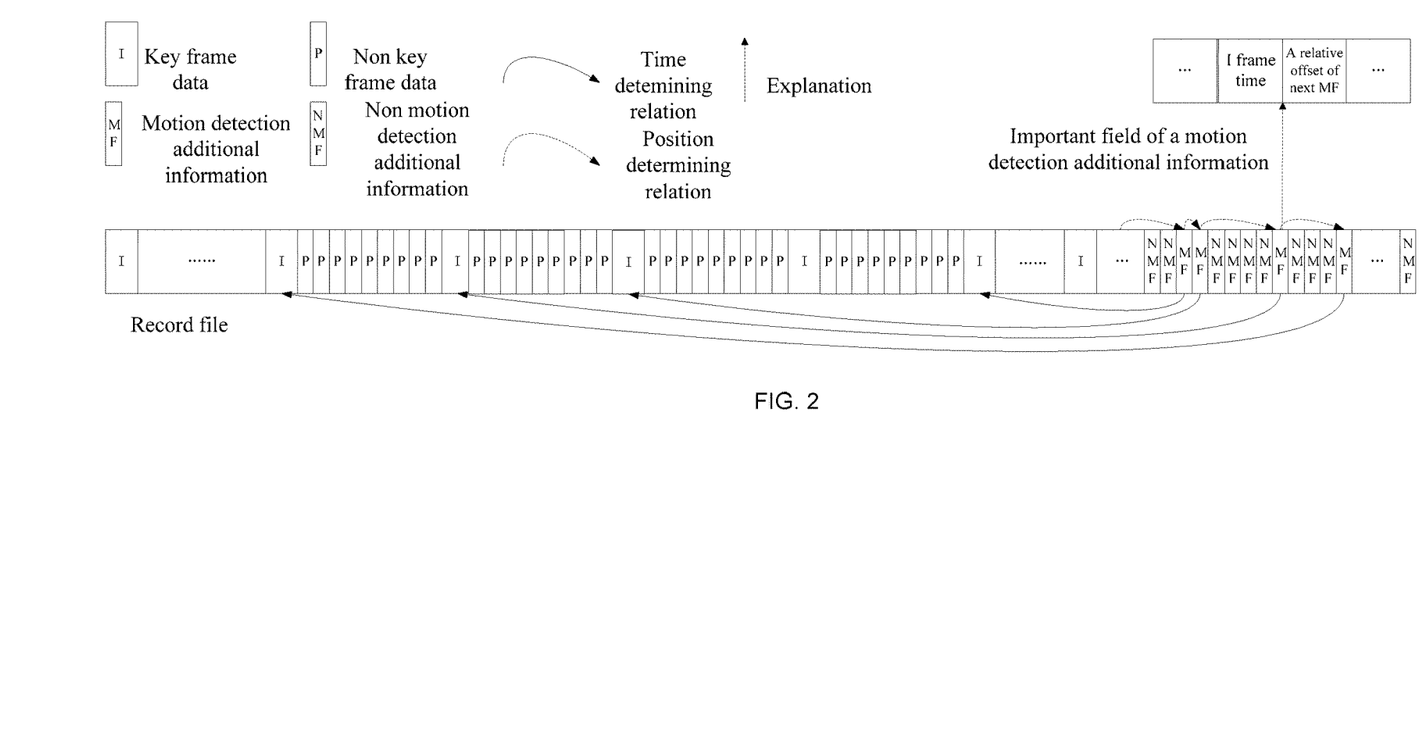
FIG. 2 is a schematic diagram of a record file according to the first embodiment of the present invention.

A record file in a hard disc is shown in FIG. 2, which is mainly comprised of a key frame (I frame) data, a non-key frame data and an additional information of a key frame. Wherein, an absolute time scale recorded in the motion detection additional information can determine a certain time point at which a key video data frame has motion data; a relative position offset recorded in the motion detection additional information can determine a position of next motion detection additional information. In the process of recording, a video data frame is written into the record file from the start position of the record file in terms of a positive sequence, and an additional information of a key frame is written into the record file from the end of the file in terms of a negative sequence. Meanwhile, a hard disc index region would continuously update information of the file being recorded, which mainly includes a start time and an end time of a certain record file, a start offset and an end offset of a file; a start time, an end time and a start offset, an end offset of additional information of a key frame. An additional information of a key frame is obtained from a position offset of the additional information of the key frame in a record file, and then a type of the additional information is taken as a basis, an absolute time scale and the time required for an intelligent playback are compared to extract the motion detection additional information meeting a condition. And the motion detection additional information meeting a condition are restructured as a motion information.

One or more adjacent motion detection additional information are utilized to form a motion information so as to describe information of a motion segment in a video record, which mainly includes a start time and an end time of corresponding data frame of a video motion segment.

Further, in detail, the step of searching for all motion detection additional information conforming to a time period of a playback request in a hard disc comprises the following substeps:

A start time and an end time of an intelligent playback are obtained according to an intelligent playback request, as a search condition for the motion detection additional information.

A video record file information in a hard disc index region is obtained, and a start time, an end time and a start offset, an end offset of additional information of key frames in the file information are extracted.

It is judged if the start time or the end time of the additional information of key frames is within a time period of the intelligent playback request.

An additional information of a key frame is obtained from the start offset and the end offset of the additional information of key frames, and it is judged if the additional information of the key frame is the motion detection additional information.

It is judged if an absolute time scale recorded in the motion detection additional information is within the time period of the intelligent playback request, and a position of next motion detection additional information is determined from a relative position offset recorded in the motion detection additional information.

The step of storing the motion detection additional information as a motion information in a motion information linked list in terms of a time sequence further comprises the following substeps:

the motion detection additional information is compared with one nearest motion information in the motion information linked list, if a time difference between the motion detection information and the nearest motion information or a time difference between two adjacent motion information is small than or equals to a second time threshold, the motion detection information is combined with the nearest motion information or the two adjacent motion information are combined into one new motion information and the motion information linked list is updated.

Figure 3:
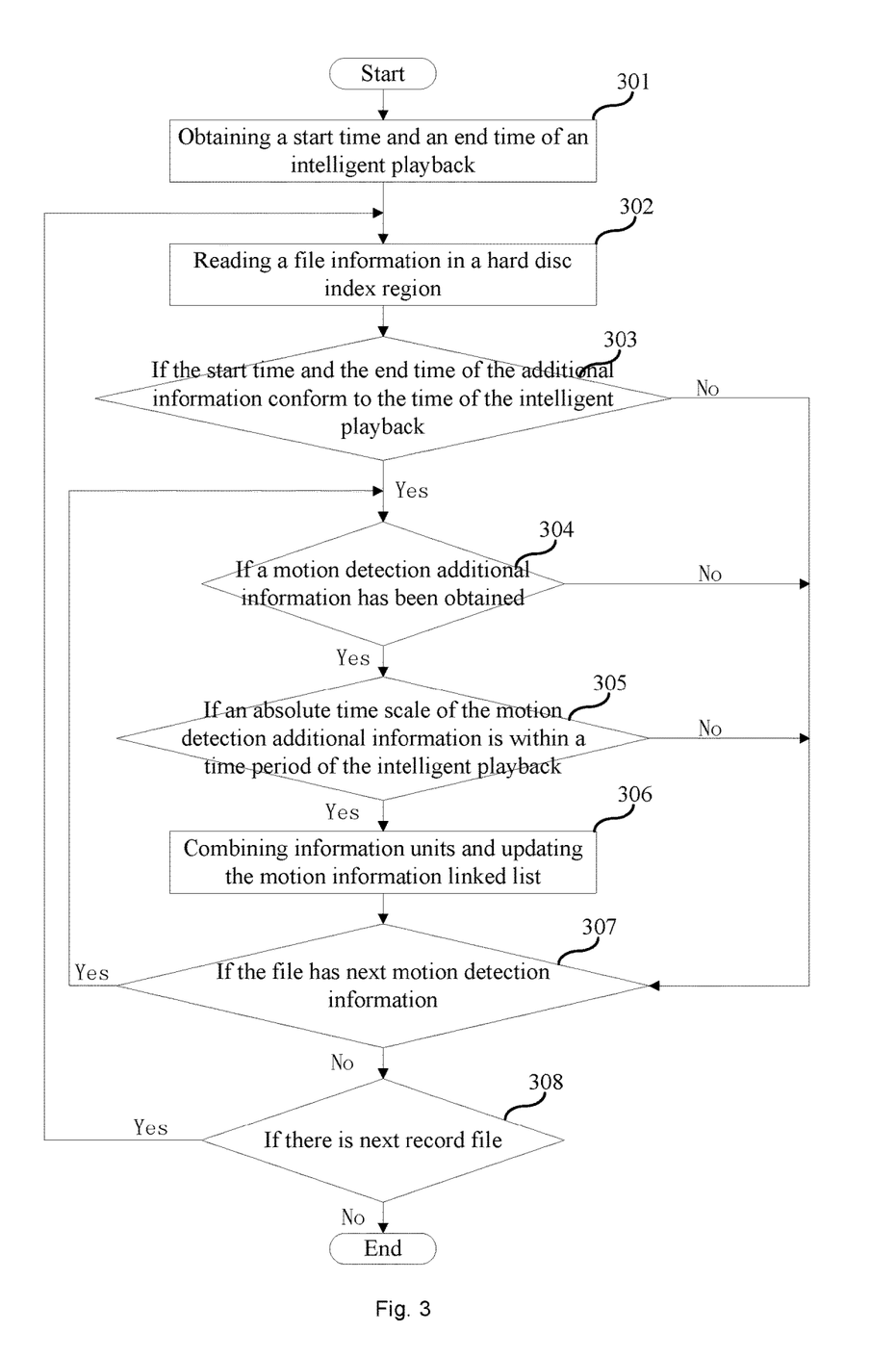
FIG. 3 is a flow chart of searching for a motion detection additional information and generating a motion information according to the first embodiment of the present invention.

It can be seen from the above content that, a flow of searching for a motion detection additional information and generating a motion information is shown in FIG. 3, which specifically comprises:

In step 301, a start time and an end time of an intelligent playback are obtained according to an intelligent playback request, as a search condition for the motion detection additional information.

Then it proceeds to step 302, a video record file information stored in a hard disc index region is obtained, and a start time, an end time and a start offset, an end offset of additional information of key frames in the file information are mainly extracted. The start offset, the end offset of the additional information of key frames in the file are mainly utilized for locating and reading the additional information.

Then it proceeds to step 303, it is judged if the start time or the end time of the additional information of key frames is within a time period of the intelligent playback request; if it is, then it proceeds to step 304; if not, then it proceeds to step 307. Wherein any of the following circumstances can be considered that the additional information of key frames are within the time period of the intelligent playback request:

the start time of the additional information of key frames is larger than or equals to the start time of the intelligent playback request, and the start time of the additional information of key frames is smaller than or equals to the end time of the intelligent playback request;

the end time of the additional information of key frames is larger than or equals to the start time of the intelligent playback request, and the end time of the additional information of key frames is smaller than or equals to the end time of the intelligent playback request.

In step 304, a start offset position of an additional information of a key frame is located, and the additional information is read. It is judged if a motion detection additional information has been obtained; if it has, then it proceeds to step 305; if not, then it proceeds to step 307. A basis for judging if an additional information of a key frame is a motion detection additional information is the main type and the sub type of the additional information.

In step 305, it is judged if an absolute time scale recorded in the motion detection additional information is within the time period of the intelligent playback request. If it is, then it proceeds to S306, if not, then it proceeds to S307.

In step 306, the motion detection additional information is compared with a nearest motion information in a linked list, if a combination condition is met, the motion detection additional information is integrated with related motion information into one new motion information, and the motion information linked list is updated. If the combination condition is not met, the motion detection additional information is inserted into the motion information linked list in terms of a time sequence, and the motion information linked list is updated.

In step 307, it is judged if there is next motion detection additional information, and the basis of the judgment is if the relative offset of next motion detection additional information recorded in the current motion detection additional information is effective. If it is, then it proceeds to step 304; if not, then it proceeds to step 308.

In step 308, it is judged if there is a video record file in the index region, if there is, then it proceeds to step 302; if not, then it exits.

A motion information linked list within the time period of the intelligent playback request can be obtained through the above steps.

Wherein, the step 306 introduces a second time threshold to integrate the motion detection additional information with the nearest motion information or integrate two adjacent motion information. If a difference between the motion detection additional information and the one nearest motion information or a time difference between two adjacent motion information is smaller than or equals to the second time threshold, then they are updated or combined into one new motion information. Respectively, the following circumstances:

(1) a time of a motion detection additional information is smaller than a start time of a latter nearest motion information and a difference between the start time of the latter nearest motion information and the time of the motion detection additional information is smaller than or equals to the second time threshold, then the latter nearest motion information is updated as one new motion information;

(2) two adjacent motion information, a difference between an end time of a previous motion information and a start time of a latter motion information is smaller than or equals to the second time threshold, then the two adjacent motion information are combined into one new motion information. The start time of the new motion information is the start time of the previous motion information, and the end time of the new motion information is the end time of the latter motion information.

Figure 4:
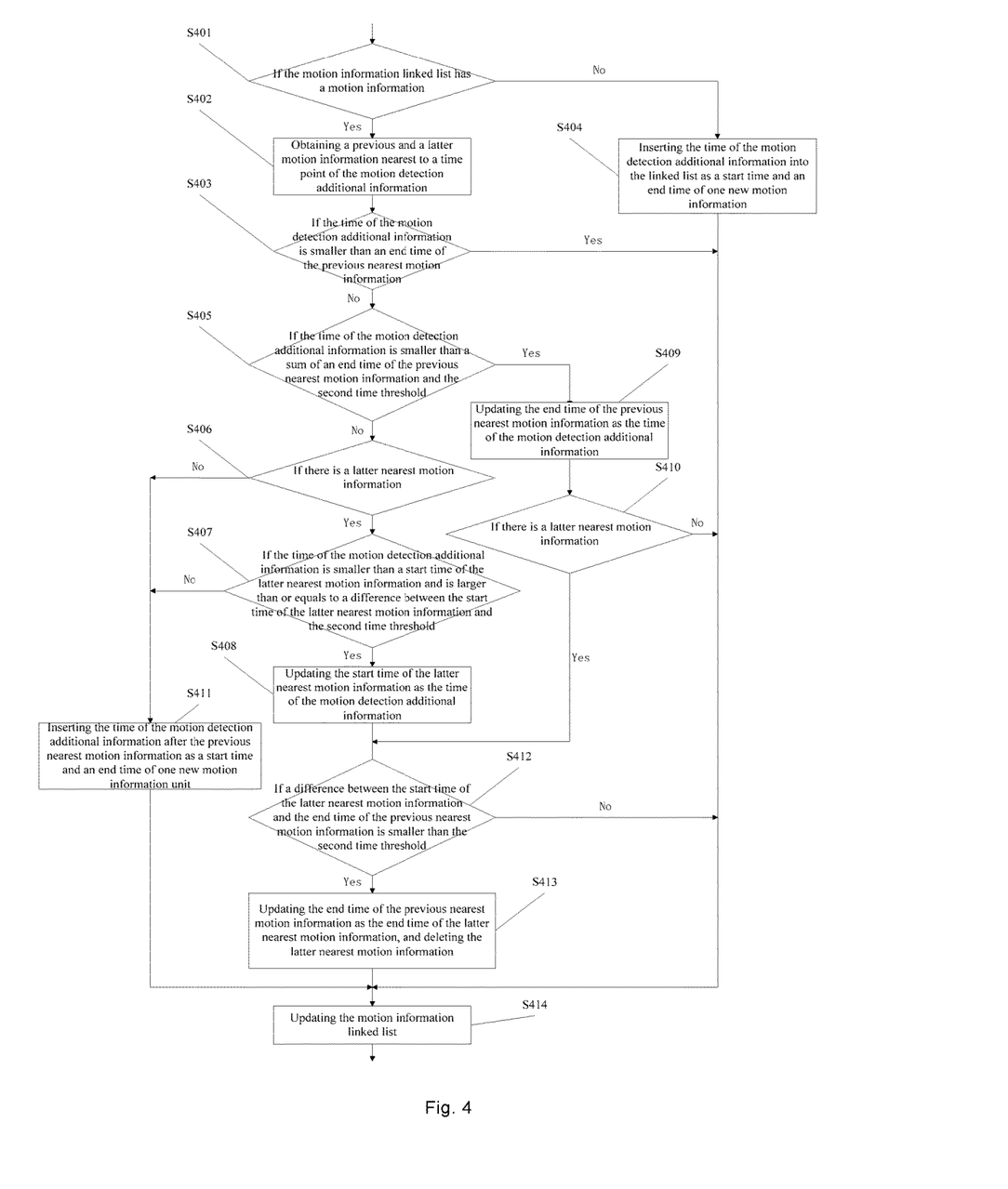
FIG. 4 is a flow chart of integrating a motion information and updating a motion information linked list according to the first embodiment of the present invention.

The step 306 of integrating a motion information and updating a motion information linked list is seen in FIG. 4 whose flow comprises:

In S401, it is judged if the motion information linked list has a motion information; if it has, then it proceeds to S402; if not, then it proceeds to S404.

In S402, a previous and a latter motion information nearest to a time point of the motion detection additional information to be inserted are obtained. Respectively, the following circumstances:

the time point of the motion detection additional information is smaller than a start time of first motion information in the motion information sequence linked list, then the first motion information is taken as the previous nearest motion information; if there is a second motion information, then the second motion information is taken as the latter nearest motion information, otherwise there is no latter nearest motion information;

the time point of the motion detection additional information is larger than an end time of last motion information in the motion information sequence linked list, then the last motion information is taken as the previous nearest motion information, and there is no latter nearest motion information;

the time point of the motion detection additional information is between a start time and an end time of a certain motion information in the motion information sequence linked list, then the motion information is taken as the previous nearest motion information; if next motion information of the motion information exists, then the next motion information of the motion information is taken as the latter nearest motion information, otherwise there is no latter nearest motion information;

the time point of the motion detection additional information is between certain two adjacent motion information in the motion information sequence linked list, i.e. being larger than an end time of a previous motion information and smaller than a start time of a latter motion information, then the previous one of the two adjacent motion information is taken as the previous nearest motion information; and the latter one of the two adjacent motion information is taken as the latter nearest motion information.

Then it proceeds to S403, it is judged if the time of the motion detection additional information is smaller than an end time of the previous nearest motion information; if it is, then it proceeds to S414; if not, then it proceeds to S405.

In S404, the time of the motion detection additional information is inserted into the linked list as a start time and an end time of one new motion information, then it proceeds to S414.

In S405, it is judged if the time of the motion detection additional information is smaller than a sum of an end time of the previous nearest motion information and the second time threshold; if it is, then it proceeds to S409; if not, then it proceeds to S406.

In S406, it is judged if there is a latter nearest motion information; if there is, then it proceeds to S407; if not, then it proceeds to S411.

In S407, it is judged if the time of the motion detection additional information is smaller than a start time of the latter nearest motion information and is larger than or equals to a difference between the start time of the latter nearest motion information and the second time threshold; if it is, then it proceeds to S408; if not, then it proceeds to S411.

In S408, the latter nearest motion information is combined with the motion detection additional information. The start time of the latter nearest motion information is updated as the time of the motion detection additional information, then it proceeds to S412.

In S409, the previous nearest motion information is combined with the motion detection additional information. The end time of the previous nearest motion information is updated as the time of the motion detection additional information.

Then it proceeds to S410, it is judged if there is a latter nearest motion information; if there is, then it proceeds to S412; if not, then it proceeds to S414.

In S411, the time of the motion detection additional information is inserted after the previous nearest motion information as a start time and an end time of one new motion information, then it proceeds to S414.

In S412, it is judged if a difference between the start time of the latter nearest motion information and the end time of the previous nearest motion information is smaller than the second time threshold; if it is, then it proceeds to S413; if not, then it proceeds to S414.

In S413, the previous nearest motion information is combined with the latter nearest motion information. The end time of the previous nearest motion information is updated as the end time of the latter nearest motion information, and the latter nearest motion information is deleted.

In S414, the motion information linked list is updated.

A motion information is an information of a time period which is formed by combining time points of respective motion detection additional information as far as possible through the above steps; an integration of motion picture fragments has been preliminarily implemented through integrating a motion detection additional information and a motion information by means of a second time threshold. An integration of motion picture fragments has been preliminarily implemented through integrating a motion information by means of a time threshold, which ensures smooth and observability of pictures during playback in an extent.

Then it proceeds to step 102, a current playback mode and a current playback time point are obtained, and a nearest motion information under the current playback mode and the current playback time point is looked up from the motion information linked list.

The nearest motion information is looked up from the motion information linked list by taking a current playback state as a search condition, the current playback state includes a current playback time point which is a time information obtained by a current decoder from the video data just decoded, and a current playback mode i.e. a forward playback or a backward playback.

Under the current playback state, the nearest motion information refers to the following circumstances:

(1) when it is a forward playback mode currently, if the current playback time point is smaller than or equals to a start time of first motion information, then the first motion information is taken as the nearest motion information; if the current playback time point is larger than an end time of last motion information, then there is no nearest motion information;

(2) when it is a backward playback mode currently, if the current playback time point is smaller than or equals to a start time of first motion information, then there is no nearest motion information; if the current playback time point is larger than or equals to an end time of last motion information, then the last motion information is taken as the nearest motion information;

(3) when it is a forward playback mode or a backward playback mode currently, if the current playback time point is between a start time and an end time of a certain motion information, then the motion information is taken as the nearest motion information;

(4) when it is a forward playback mode currently, if the current playback time point is larger than an end time of a previous motion information and is smaller than or equals to a start time of a latter motion information, then the latter motion information is taken as the nearest motion information;

(5) when it is a backward playback mode currently, if the current playback time point is larger than or equals to an end time of a previous motion information and is smaller than a start time of a latter motion information, then the previous motion information is taken as the nearest motion information.

Figure 5:
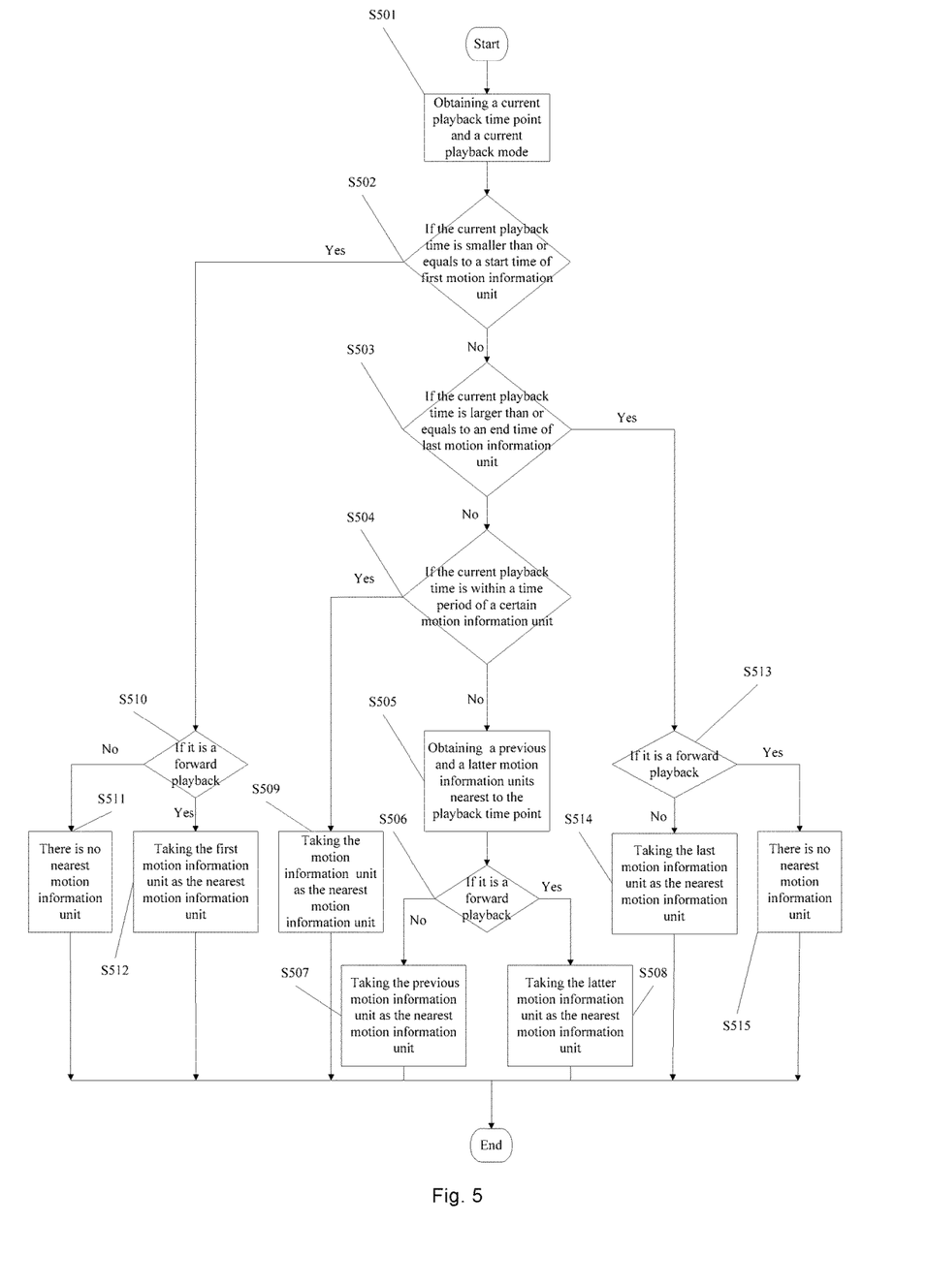
FIG. 5 is a flow chart of looking up a nearest motion information according to the first embodiment of the present invention.

A flow of looking up the nearest motion information is shown in FIG. 5, which comprises the following steps:

In S501, a current playback time point and a current playback mode are obtained.

Then it proceeds to S502, it is judged if the current playback time is smaller than or equals to a start time of first motion information; if it is, then it proceeds to S510; if not, then it proceeds to S503.

In S503, it is judged if the current playback time is larger than or equals to an end time of last motion information; if it is, then it proceeds to S513; if not, then it proceeds to S504.

In S504, it is judged if the current playback time is within a time period of a certain motion information; if it is, then it proceeds to S509; if not, then it proceeds to S505.

In S505, the motion information sequence linked list is traversed, and a previous and a latter motion information nearest to the playback time point are obtained.

Then it proceeds to S506, it is judged if the current playback mode is a forward playback; if it is, then it proceeds to S508; if not, then it proceeds to S507.

In S507, the nearest motion information has been found, taking the previous motion information as the nearest motion information, and then it ends the flow.

In S508, the nearest motion information has been found, taking the latter motion information as the nearest motion information, and then it ends the flow.

S509: the nearest motion information has been found, taking the motion information as the nearest motion information, and then it ends the flow.

In S510, it is judged if the current playback mode is a forward playback; if it is, then it proceeds to S512; if not, then it proceeds to S511.

In S511, there is no nearest motion information, and then it ends the flow.

In S512, the nearest motion information has been found, taking the first motion information as the nearest motion information, and then it ends the flow.

In S513, it is judged if the current playback mode is a forward playback; if it is, then it proceeds to S515; if not, then it proceeds to S514.

In S514, the nearest motion information has been found, taking the last motion information as the nearest motion information, and then it ends the flow.

In S515, there is no nearest motion information, and then it ends the flow.

When the current playback state varies, the current nearest motion information can be found in terms of the above steps and taking the current playback state as the search condition.

Then it proceeds to step 103, the found nearest motion information is matched with the current playback time point.

Specifically, the step 103 comprises the following substeps:

When the current playback mode is a backward playback, it is judged if a difference between the current playback time and a third time threshold is smaller than or equals to an end time of the nearest motion information, if it is, then a current picture is determined as a motion picture. If not, the current picture is determined as a static picture.

When the current playback mode is a forward playback, it is judged if a sum of the current playback time and the third time threshold is larger than or equals to a start time of the nearest motion information, if it is, then the current picture is determined as a motion picture. If not, the current picture is determined as a static picture.

A time threshold is utilized to adjust the playback speed to a normal speed before a motion picture has appeared, so that a user could observe a static circumstance before a motion in more detail, ensuring obtaining more observation details.

In addition, it further comprises: motion segment fragments are integrated, and a previous and a latter motion segments of short durations are combined into a motion segment of a long duration.

Specifically, the step of integrating motion segment fragments and combining a previous and a latter motion segments of short durations into a motion segment of a long duration comprises the following substeps:

When a time difference between the previous and the latter motion segments is smaller than or equals to a first time threshold, the two motion segments are integrated into one motion segment.

Integrating motion segment fragments and combining a previous and a latter motion segments of short durations into a segment of a long duration may ensure continuity and observability during a playback of video records.

It can be seen from the above content that, matching the current time point refers to if the current playback time point is within a time period of the found nearest motion information. The present invention performs a matching judgment by means of a time threshold. Meanwhile integrating motion segment fragments and combining a previous and a latter motion segments of short durations into a segment of a long duration are further implemented through this means, so as to ensure continuity and observability during playback. And a time threshold is introduced to adjust a playback speed to a normal speed before a motion picture has appeared, so that a user could observe a static circumstance before a motion in more detail, ensuring obtaining more observation details.

Figure 6:
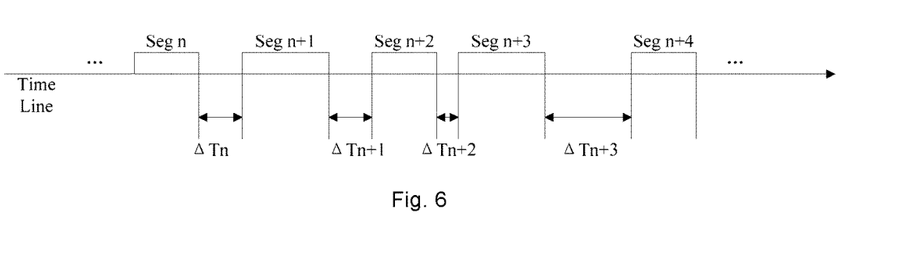
FIG. 6 is a schematic diagram of an integration of motion segment fragments according to the first embodiment of the present invention.

FIG. 6 is a schematic diagram of an integration of motion segment fragments, and an analysis process is as follows:

(1) wherein Segn, Segn+1, Segn+2, Segn+3, Segn+4 are respectively nth,(n+1)th, (n+2)th, (n+3)th, (n+4)th motion picture video segments corresponding to respective motion information in the video record file. $\Delta Tn$, $\Delta Tn+1$, $\Delta Tn+2$, $\Delta Tn+3$, $\Delta Tn+4$ are respectively time differences between a previous and a latter motion segments.

(2) now an integration threshold $\Delta HT$ is set, and when the time difference $\Delta T$ between the previous and the latter motion segments does not exceed $\Delta HT$, the two motion segments are integrated into one motion segment played back in a normal speed. Taking $\Delta Tn$ as an example, when $\Delta Tn <= \Delta HT$, a playback speed of the video record segment from the start time of Segn to the end time of Segn+1 is normal.

Figure 7:
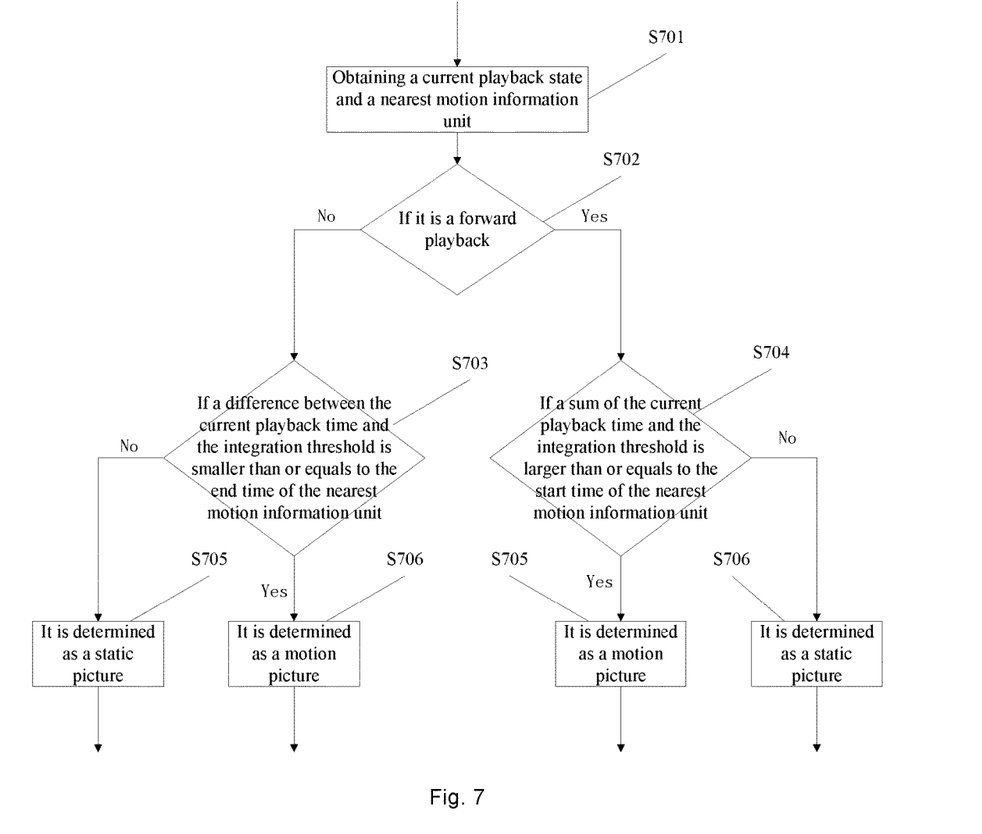
FIG. 7 is a flow chart of matching the nearest motion information according to the first embodiment of the present invention.

FIG. 7 is a flow chart of matching the nearest motion information which comprises the following steps:

In S701, a current playback state and a nearest motion information are obtained, the current playback state including a current playback time, a current playback mode;

Then it proceeds to S702, it is judged if the current playback mode is a forward playback; if it is, then it proceeds to S704; if not, then it proceeds to S703.

In S703, it is judged if a sum of the current playback time and the integration threshold is larger than or equals to the start time of the nearest motion information; if it is, then it proceeds to S706; if not, then it proceeds to S705.

In S704, it is judged if a difference between the current playback time and the integration threshold is smaller than or equals to the end time of the nearest motion information; if it is, then it proceeds to S706; if not, then it proceeds to S705.

In S705, the current picture is determined as a static picture.

In S706, the current picture is determined as a motion picture.

A time matching and an integration of motion segments can be implemented by circularly performing steps S701-S706.

The present invention provides a method for matching a time point of a motion information with a current playback time point. A time period of the motion information nearest to the current playback time point is looked up for matching according to the current playback time point and a forward and backward playback mode.

The present invention provides a method for integrating motion segment fragments. A previous and a latter motion segments of short durations are combined into a segment of a long duration, so as to ensure continuity and observability during playback.

Then it proceeds to step 104, a playback speed is controlled according to a matching result, so as to implement an automatic control of an intelligent playback speed.

Then it returns to step 102 again.

A real-time, automatic, continuous control of a playback speed can be implemented by repeating performing the above steps 102, 103 and 104, so that automatically adjusting to a normal playback speed when there is motion data and automatically adjusting to a rapid playback when there is no motion data are implemented, and a playback time of video records can be reduced.

Specifically, the step 104 comprises the following substeps:

according to the matching result, if video record data played back currently is a motion picture, then a decoding speed of a decoder is set to a normal speed. If the video record data played back currently is a static picture, then the decoding speed of the decoder is set to be rapid.

Utilizing a normal speed playback when a motion picture is played back and utilizing a rapid playback when a static picture is played back may reduce a playback time of record files, rapidly filter the static picture and focus on the motion picture having motion data.

It can be seen from the above content that, a playback control carries out processing and receiving various playback requests, such as stop playback, pause playback, a forward and backward switch, drag, clip etc.; the video record data is read and transmitted to the decoder; and a matching result is further received as a basis for controlling a playback speed, and a decoding speed command is transmitted to the decoder to implement an automatic control of an intelligent playback speed.

Figure 8:
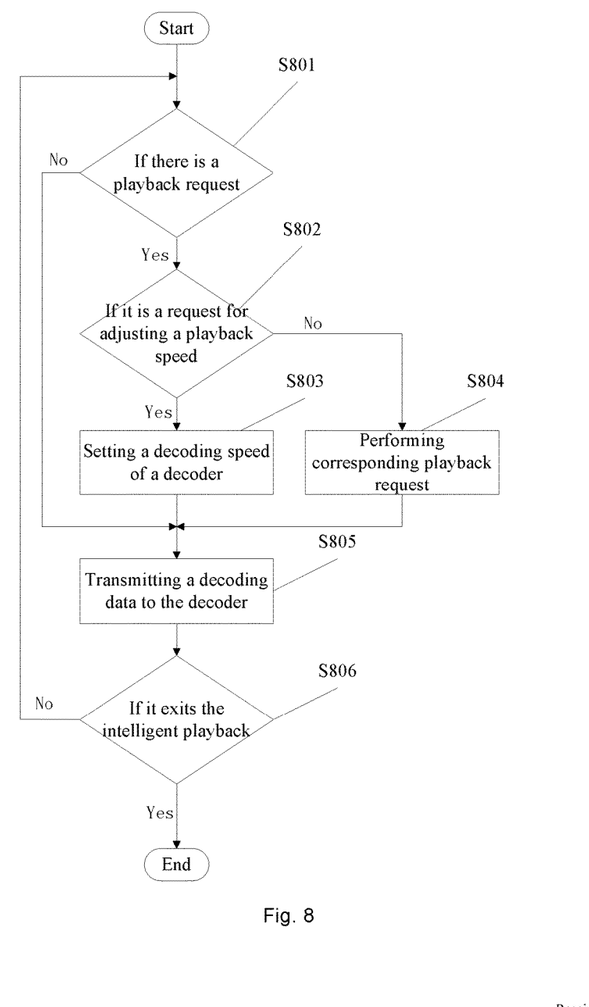
FIG. 8 is a flow chart of a playback control according to the first embodiment of the present invention.

FIG. 8 is a flowchart of a playback control which comprises the following steps:

In S801, it is judged if a playback request has been received, such as stop playback, pause playback, a forward and backward switch, drag, clip, set playback speed etc.; if it has, then it proceeds to S802; if not, then it proceeds to S805.

In S802, it is judged if current playback request is a request for setting a playback speed; if it is, then it proceeds to S803; if not, then it proceeds to S804.

In S803, according to the matching result, if the video data played back currently is a motion picture, then a decoding speed of a decoder is set to a normal speed; if the video data played back currently is a static picture, then the decoding speed of the decoder is set to be rapid.

In S804, corresponding playback request is performed, such as performing other operations such as a pause, a forward and backward switch, a drag, a clip etc..

In S805, the video data is transmitted to a decoding buffer. If there is no other playback request, reading video data from a hard disc memory is not influenced by a playback speed, the data would not be read selectively and the video data is read in terms of a sequence all the time.

Then it proceeds to S806, it is judged if it exits the intelligent playback. If it is, then it exits the intelligent playback and ends the present flow; if not, then it proceeds to S801.

Receiving and processing a playback request can be implemented by circularly performing steps S801-S806, and automatically adjusting to a normal playback speed when a motion picture is played back and automatically adjusting to a rapid playback when a static picture is played back are implemented according to a request for adjusting a playback speed which is generated from a matching result.

The present invention provides a method for automatically controlling a playback speed. A playback speed is automatically controlled by judging if a current playback time point has a motion detection information. It automatically adjusts to a normal playback speed when there is motion data, and automatically adjusts to a rapid playback when there is no motion data.

By judging if a current playback time point has a motion detection information, a static picture not having motion data and a motion picture having motion data are distinguished, and a playback speed of video records is automatically controlled, automatically adjusting to a normal playback speed when there is motion data and automatically adjusting to a rapid playback when there is no motion data, which rapidly filters the static picture, focuses on the motion picture having motion data and can reduce a playback time of video records.

Figure 9:
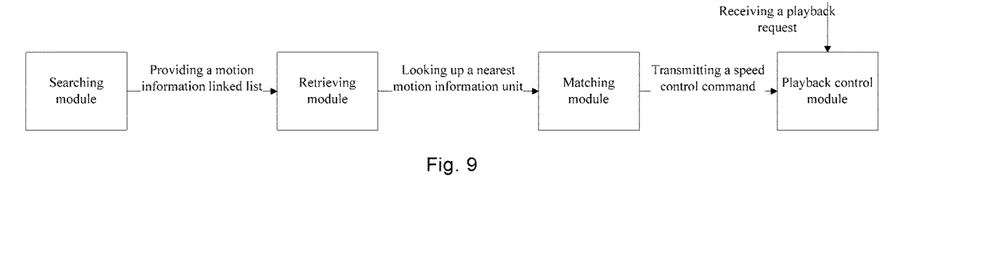
FIG. 9 is a schematic diagram of an intelligent playback apparatus for video records based on a motion information according to the second embodiment of the present invention.

The method embodiments of the present invention all can be realized by software, hardware and firmware etc.. Regardless of the present invention is realized by software, or hardware, or firmware, the instruction codes can be stored in any type of computer accessible memory (such as permanent or can be modified, volatile or non-volatile, solid-state or non solid, fixed or replaceable medium etc.). Similarly, the memory can be, for example, programmable array logic(PAL), random access memory(RAM), programmable read only memory(PROM), read-only memory(ROM), electrically erasable programmable ROM(EEPROM), floppy disc, optical disc, and digital versatile disc(DVD) etc.. The second embodiment of the present invention relates to an intelligent playback apparatus for video records based on motion information. FIG. 9 is a schematic diagram of the intelligent playback apparatus for video records based on motion information.

Specifically, as shown in FIG. 9, the intelligent playback apparatus for video records based on motion information comprises:

a searching module that searches for all motion detection additional information conforming to a time period of a playback request in a hard disc, and stores the motion detection additional information as a motion information in a motion information linked list in terms of a time sequence, wherein the motion detection additional information is utilized for recording information of a key frame having motion data in video record data.

a retrieving module that looks up a nearest motion information under a current playback mode and a current playback time point in the motion information linked list according to the current playback mode and the current playback time point.

a matching module that matches the found nearest motion information with the current playback time point.

a playback control module that controls a playback speed according to a matching result of the matching module, so as to implement an automatic control of an intelligent playback speed.

Specifically:

It further comprises;

an integrating module that integrates motion segment fragments, and combines a previous and a latter motion segments of short durations into a motion segment of a long duration.

A motion detection additional information refers to one kind of an additional information of a key frame (I frame) in a video record file, which is utilized for recording information of a key frame having motion data in a video record file, including an absolute time scale, a relative time scale, a motion information of the key frame, a main type, a sub type of the additional information and a relative offset of next additional information of same type etc.. The information is obtained via a certain motion detection algorithm during recording, and encoded and stored together with a video record data in a hard disc.

The motion detection additional information includes: an absolute time scale, a relative position offset, a main type and a sub type of the additional information.

The absolute time scale is utilized for determining a certain time point at which a key frame has motion data.

The relative position offset is utilized for determining a position of next motion detection additional information.

The main type and the sub type of the additional information are utilized for judging if one additional information of a key frame is a motion detection additional information.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

It should be noted that modules disclosed in each apparatus embodiment of the present invention are logical modules, on the physical, a logic module can be a physical module, and may be part of a physical module, or implemented in combination of several physical modules, and physical implementing methods for these logic modules themselves are not the most important, the combination of the functions achieved by these logic modules is the key to solving the technical problem disclosed in the present invention. Furthermore, in order to highlight innovative part of the present invention, the above apparatus embodiments of the present invention do not introduce the modules which are not related closely to solving the technical problem disclosed in the present invention, which does not indicate that the above apparatus embodiments do not include other modules.

It should be explained that in the Claims and Description of the present invention, relationship terms such as first, second etc are just utilized to distinguish one entity or manipulation from another entity or manipulation, instead of requiring or indicating any practical relation or sequence existing between these entities or manipulations. And, the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to certain preferred embodiments of the present invention, the present invention has been shown and described. But it should be understood to those skilled in the art that various other changes in the forms and details may be made without departing from the principles and scope of the present invention.

What is claimed:

1. An intelligent playback method for video records based on a motion information, the method comprising:

searching, by a processor, for all motion detection additional information conforming to a time period of a playback request in a hard disc, and storing the motion detection additional information as a motion information in a motion information linked list in terms of a time sequence, wherein the motion detection additional information is utilized for recording information of a key frame having motion data in video record data, wherein one or more adjacent motion detection additional information are utilized to form the motion information so as to describe information of a motion segment in a video record, including a start time and an end time of corresponding data frame of a video motion segment;

obtaining, by the processor, a current playback mode and a current playback time, and looking up a nearest motion information under the current playback mode and the current playback time from the motion information linked list;

matching, by the processor, the found nearest motion information with the current playback time;

integrating, by the processor, motion segment fragments and combining a previous and a latter motion segments of short durations into a motion segment of a long duration so as to implement an automatic control of an intelligent playback speed, including:

if a time difference between the previous and the latter motion segments is smaller than or equal to a first time threshold, integrating the two motion segments into one motion segment; and controlling, by the processor, a playback speed according to a matching result, so as to implement an automatic control of an intelligent playback speed, wherein the searching for all motion detection additional information conforming to a time period of a playback request in a hard disc comprises:

obtaining, by the processor, a start time and an end time of an intelligent playback according to an intelligent playback request, as a search condition for the motion detection additional information;

obtaining, by the processor, a video record file information in a hard disc index region, and extracting a start time, an end time and a start offset, an end offset of additional information of key frames in the file information;

judging, by the processor, if the start time or the end time of the additional information of key frames is within a time period of the intelligent playback request;

obtaining, by the processor, an additional information of a key frame from the start offset and the end offset of the additional information of key frames, and judging if the additional information of the key frame is the motion detection additional information; and judging, by the processor, if an absolute time scale recorded in the motion detection additional information is within the time period of the intelligent playback request, and determining a position of next motion detection additional information from a relative position offset recorded in the motion detection additional information.

2. The intelligent playback method for video records based on a motion information according to claim 1, wherein the storing the motion detection additional information as the motion information in the motion information linked list in terms of the time sequence comprises:

comparing, by the processor, the motion detection additional information with one nearest motion information in the motion information linked list, if a time difference between the motion detection information and the one nearest motion information or a time difference between two adjacent motion information is smaller than or equals to a second time threshold, combining the motion detection information with the one nearest motion information or combining the two adjacent motion information into one new motion information and updating the motion information linked list.

3. The intelligent playback method for video records based on a motion information according to claim 2, wherein the matching the found nearest motion information with the current playback time comprises:

when the current playback mode is a backward playback, judging, by the processor, if a difference between the current playback time and a third time threshold is smaller than or equals to an end time of the nearest motion information, if it is, then determining a current picture as a motion picture; if not, then determining the current picture as a static picture;

when the current playback mode is a forward playback, judging, by the processor, if a sum of the current playback time and the third time threshold is larger than or equals to a start time of the nearest motion information, if it is, then determining the current picture as a motion picture; if not, then determining the current picture as a static picture.

4. The intelligent playback method for video records based on a motion information according to claim 3, wherein the controlling the playback speed according to the matching result, so as to implement an automatic control of the intelligent playback speed comprises:

according to the matching result, if the video record data played back currently is a motion picture, then setting a decoding speed of a decoder to a normal speed; if the video record data played back currently is a static picture, then setting, by the processor, the decoding speed of the decoder to be rapid.

5. An intelligent playback apparatus for video records based on a motion information, the apparatus comprising:

a processor and a memory having computer-readable instructions that when executed by the processor performs a method, including:

searching for all motion detection additional information conforming to a time period of a playback request in a hard disc, and storing the motion detection additional information as a motion information in a motion information linked list in terms of a time sequence, wherein the motion detection additional information is utilized for recording information of a key frame having motion data in video record data, one or more adjacent motion detection additional information are utilized to form the motion information so as to describe information of a motion segment in a video record, including a start time and an end time of corresponding data frame of a video motion segment;

looking up a nearest motion information under a current playback mode and a current playback time in the motion information linked list according to the current playback mode and the current playback time;

matching the found nearest motion information with the current playback time; and controlling a playback speed according to a matching result, so as to implement an automatic control of an intelligent playback speed;

wherein, the processor further integrates motion segment fragments and combines a previous and a latter motion segments of short durations into a motion segment of a long duration; and wherein the motion detection additional information includes:

an absolute time scale, a relative position offset, a main type and a sub type of an additional information;

the absolute time scale is utilized for determining a certain time at which a key frame has motion data;

the relative position offset is utilized for determining a position of next motion detection additional information; and the main type and the sub type of an additional information are utilized for judging if one additional information of a key frame is a motion detection additional information.

* * * * *